(12) United States Patent
Atsuta

(10) Patent No.: US 10,693,394 B2
(45) Date of Patent: Jun. 23, 2020

(54) DRIVING APPARATUS OF VIBRATION-TYPE ACTUATOR METHOD OF CONTROLLING DRIVING VIBRATION-TYPE ACTUATOR AND IMAGE PICKUP APPARATUS

(71) Applicant: CANON KABUSHIKI KAISHA, Tokyo (JP)

(72) Inventor: Akio Atsuta, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/483,761

(22) Filed: Apr. 10, 2017

(65) Prior Publication Data
US 2017/0214340 A1 Jul. 27, 2017

Related U.S. Application Data

(62) Division of application No. 14/086,868, filed on Nov. 21, 2013, now abandoned.

(30) Foreign Application Priority Data
Nov. 26, 2012 (JP) ................................. 2012-257877

(51) Int. Cl.
*H02N 2/14* (2006.01)
*H02N 2/10* (2006.01)
*H02N 2/00* (2006.01)

(52) U.S. Cl.
CPC ............. *H02N 2/145* (2013.01); *H02N 2/103* (2013.01); *H02N 2/142* (2013.01); *H02N 2/0015* (2013.01)

(58) Field of Classification Search
USPC ......................... 318/114, 671, 486, 128, 460
See application file for complete search history.

(56) References Cited

U.S. PATENT DOCUMENTS

| | | | | |
|---|---|---|---|---|
| 8,618,887 | B2 * | 12/2013 | Dickey | H03K 7/08 331/111 |
| 2002/0082090 | A1 * | 6/2002 | Shinohara | A63F 13/06 463/43 |
| 2002/0155804 | A1 * | 10/2002 | Poutot | F01P 7/048 454/75 |
| 2003/0015982 | A1 * | 1/2003 | Cox-Smith | G05B 19/406 318/433 |
| 2008/0150393 | A1 | 6/2008 | Funakubo | |
| 2009/0066187 | A1 | 3/2009 | Kudo | |
| 2011/0298400 | A1 | 12/2011 | Kudo | |

(Continued)

FOREIGN PATENT DOCUMENTS

| | | | | |
|---|---|---|---|---|
| JP | 59191493 A | * | 10/1984 | ............. H02H 7/085 |
| JP | 63114507 A | * | 5/1988 | |
| JP | 2003325508 A | * | 11/2003 | ............. A61B 8/546 |

*Primary Examiner* — Jorge L Carrasquillo
(74) *Attorney, Agent, or Firm* — Canon U.S.A., Inc. IP Division

(57) ABSTRACT

A driving apparatus of a vibration-type actuator includes a driving circuit configured to drive a vibration unit including a plurality of vibrators, a detection unit configured to detect a sum of power consumption consumed by the plurality of vibrators, and a driving frequency setting unit configured to set a driving frequency within a frequency range depending on the sum of power consumption detected by the detection unit.

38 Claims, 15 Drawing Sheets

(56) References Cited

U.S. PATENT DOCUMENTS

| | | | |
|---|---|---|---|
| 2012/0202441 A1* | 8/2012 | Mimino | G01R 21/10 455/115.1 |
| 2013/0032671 A1* | 2/2013 | Giles | B64D 15/16 244/134 R |
| 2013/0167495 A1* | 7/2013 | Borinato | A01D 34/78 56/10.2 G |
| 2013/0265025 A1* | 10/2013 | Hattori | H02M 3/1588 323/282 |

* cited by examiner

80

DRIVING APPARATUS OF VIBRATION-TYPE ACTUATOR METHOD OF CONTROLLING DRIVING VIBRATION-TYPE ACTUATOR AND IMAGE PICKUP APPARATUS

CROSS-REFERENCE TO RELATED APPLICATION

This application is a Divisional of U.S. application Ser. No. 14/086,868 filed Nov. 21, 2013, which claims the benefit of Japanese Patent Application No. 2012-257877, filed Nov. 26, 2012, which is hereby incorporated by reference herein in its entirety.

BACKGROUND OF THE INVENTION

Field of Invention

An aspect of the present disclosure relates to a driving apparatus of a vibration-type actuator, a method of controlling driving a vibration-type actuator, and an image pickup apparatus, and more specifically, to a driving apparatus of a vibration-type actuator configured to, for example, generate a vibration wave in an ultrasonic vibrator thereby relatively moving a driven element in contact with the ultrasonic vibrator by frictional force, a method of controlling driving such a vibration-type actuator, and an image pickup apparatus including such a driving apparatus.

Description of the Related Art

A camera, a video camera, and other devices are commercially available which use a vibration-type actuator configured to apply an AC signal to an electric-mechanical energy conversion element (hereinafter referred to as an electromechanical transducer) thereby causing a vibrating element to generate a driving force. FIG. 11 illustrates an example of a basic structure of a vibration-type actuator. That is, FIG. 11 is a perspective view illustrating an example of a basic structure of a vibration-type actuator according to a related technique. As illustrated in FIG. 11, a vibrator of this vibration-type actuator includes an elastic element 4 made of a rectangular-shaped plate of a metallic material. A piezoelectric element (electromechanical transducer) 5 is bonded to a back surface of the elastic element 4. A plurality of protruding parts 6 are formed at particular locations on the upper surface of the elastic element 4. In this structure, when an AC voltage is applied to the piezoelectric element 5, a second-order bending vibration in a direction along longer sides of the elastic element 4 and a first-order bending vibration in a direction along shorter sides of the elastic element 4 occur simultaneously, which excites the protruding parts 6 to have elliptic motion. In this situation, if there is a driven element 7 pressed into contact with the protruding parts 6, the element 7 is driven linearly by the elliptic motion of the protruding parts 6. That is, the protruding parts 6 function as a driving unit of the vibrator.

A detailed description of the structure and the drive principle of the vibration-type actuator of the above-described type may be found, for example, in Japanese Patent Laid-Open No. 2004-320846, and thus a further description thereof is omitted. Note that the vibrator includes a vibration generation part including an elastic element and a piezoelectric element bonded together, the vibration-type actuator includes a driving force generation part that generates a driving force to move the pressed-into-contact driven element relatively with respect to the vibrator, and a vibration-type motor apparatus includes at least one driving force generation part. By applying the driving force to the driven element, the driven element is caused to have a rotary or linear motion.

FIG. 12 illustrates a switching circuit configured to drive a vibration-type actuator. In FIG. 12, reference numeral 8 denotes one vibrator illustrated in a schematic manner. A voltage is applied between a VA-phase and a VA'-phase, and a voltage with a different phase is applied between a VB-phase and a VB'-phase thereby generating two modes necessary for the driving. The circuit illustrated in FIG. 12 operates as described in detail below. The switching circuit is input with first and second pulse signals A and B. The first pulse signal A is a pulse signal generated by an oscillator unit (not illustrated) so as to have a frequency equal to a resonance frequency of the vibration-type actuator, and the second pulse signal B is a pulse signal having the same frequency as that of the first pulse signal A but having a different phase. Note that the pulse width of each pulse and a phase difference between the pulse signal A and the pulse signal B are variable. A' denote a pulse signal with a phase different by 180° from that of the pulse signal A, and B' denote a pulse signal with a phase different by 180° from that of the pulse signal B. The switching circuit (switching unit), which is surrounded by a broken line in FIG. 12, is configured switch the motor supply voltage on and off according to the pulse signals A, B, A', and B'. More specifically, the motor supply voltage is switched by switching elements 51 and 52 to generate a voltage pulse VA that turns on and off between the power supply voltage and a GND voltage according to timing of A. The generated voltage pulse VA is applied to one end (A+) of a piezoelectric element A of the vibration-type actuator via an impedance element 41. Similarly, the motor supply voltage is switched by switching elements 53 and 54 to generate a voltage pulse VA' that turns on and off between the power supply voltage and the GND voltage according to timing of A', and the generated voltage pulse VA' is applied to the other end (A−) of the piezoelectric element A of the vibration-type actuator. Similarly, a piezoelectric element B is driven as follows. That is, the motor supply voltage is switched by switching elements 55 and 56 to generate a voltage pulse VB that turns on and off between the power supply voltage and the GND voltage according to timing of B, and the generated voltage pulse VB is applied to one end (B+) of the piezoelectric element B of the vibration-type actuator via an impedance element 42. Similarly, the motor supply voltage is switched by switching elements 57 and 58 to generate a voltage pulse VB' that turns on and off between the power supply voltage and the GND voltage according to timing of B', and the generated voltage pulse VB' is applied to the other end (B−) of the piezoelectric element B of the vibration-type actuator. The inductance of each impedance element described above is selected so as to achieve impedance matching with the vibration-type actuator thereby allowing it to provide an increased voltage and increased input power to the vibration-type actuator. The motor power supply may be, for example, a stabilized power supply, a battery, or the like.

FIG. 13 is a graph illustrating a phase difference between a driving voltage and a detected voltage, a speed, and electric power as a function of a driving frequency for a case in which a vibration detecting unit is disposed in a part of the piezoelectric element of the vibration-type actuator. The vibration-type actuator may be controlled in terms of speed as follows. Measurement is performed on the speed of a driven element (moving element, in this specific case) that is pressed into contact with the vibration-type actuator and driven by friction. When the detected speed is lower than a target speed, the frequency is reduced to increase the speed. Conversely, when the detected speed is higher than the target speed, the frequency is increased. The vibration motor generally has a characteristic that a reduction in driving frequency leads to an increase in input electric power and output. When a load is constant, a reduction in frequency causes the speed to increase. Thus, a necessary output for a particular load is obtained by determining the motor output such that the target speed is obtained and the input electric power does not exceed the predetermined value. When the load increases beyond an assumed maximum value, the speed of the motor decreases. In such a situation, if the frequency is reduced to try to obtain the target speed, the input electric power may exceed the preset upper limit of electric power. This vibration-type actuator also has a characteristic that when the driving frequency is gradually reduced from a value higher than the resonance frequency, the speed reaches its maximum value and a large amplitude of vibration occurs at the resonance frequency. However, if the driving frequency is further reduced beyond the resonance frequency, an abrupt reduction in speed occurs. When the load increases beyond the assumed maximum value, if the speed control algorithm described above is performed in the frequency range in which the abrupt reduction in speed occurs, there is a possibility that a continuous reduction occurs in the driving frequency below the resonance frequency, which may result in an increase in input electric power beyond a necessary value. To avoid the above situation, the vibration detecting unit may be disposed in a part of the piezoelectric element and the phase difference between the driving voltage and the detected voltage may be monitored such that the reducing of the driving frequency is stopped before the driving frequency reaches the critical value beyond which a further reduction in the driving frequency leads to the abrupt reduction in speed.

FIG. 14 illustrates an example of a structure in which a plurality of vibrators are disposed in a straight line. A moving element 7 is pressed into contact with vibrators S1 and S2 such that the moving element 7 is driven in a linear direction. More specifically, in the example illustrated in FIG. 14, two vibrators are disposed in a linear line to achieve a thrust twice stronger than is achieved by the structure including only one vibrator, thereby making it possible to generate output greater than is generated by the structure including one vibrator. Similarly, the thrust may be increased by a factor of 3, 4, or more by providing as many vibrators as the corresponding factor 3, 4, or more. That is, the number of vibrators may be adjusted depending on the necessary thrust.

SUMMARY OF THE INVENTION

In the above-described vibration-type motor apparatus using a plurality of vibrators, to drive the vibration-type motor apparatus with the optimum frequency using the related technique, the phase difference between the driving voltage and the voltage of the vibration detecting unit is detected for each of vibrators. Subsequently, a plurality of signal processing circuits are necessary, which results in an increase in a total circuit complexity. To achieve the operation using only one phase detection unit (detector) and one signal processing circuit, it may be necessary, for example, to select a vibrator that exhibits an abrupt reduction in speed at the highest driving frequency of all vibrators. Hereinafter, such a driving frequency blow which an abrupt reduction in speed occurs refers to as a critical driving frequency. Even when it is possible to identify which one of vibrators has the highest critical driving frequency, to avoid the abrupt reduction in speed, it is necessary to have a large margin in operation conditions taking into account a difference among the vibrators in terms of characteristic of a phase difference between the driving voltage and the detected voltage.

In view of the above, embodiments of the invention relate to a driving apparatus of a vibration-type actuator capable of operating within a particular frequency range thereby suppressing an abrupt reduction in speed due to an overload or a difference in characteristic among vibrators, a method of controlling driving a vibration-type actuator, and an image pickup apparatus including such a driving apparatus.

According to an embodiment, a driving apparatus of a vibration-type actuator includes a driving circuit configured to drive a vibration unit including a plurality of vibrators, a detector configured to detect a sum of power consumption consumed by the plurality of vibrators, and a driving frequency setting unit configured to set a driving frequency within a frequency range depending on the sum of power consumption detected by the detector. According to an embodiment, a method of controlling driving a vibration-type actuator includes detecting a sum of power consumption consumed by a plurality of vibrators, and controlling a driving frequency within a frequency range based on the detected sum of power consumption.

Further features of the present invention will become apparent from the following description of exemplary embodiments with reference to the attached drawings.

DESCRIPTION OF THE EMBODIMENTS

The present invention is described below with reference to embodiments.

First Embodiment

Figure 1:
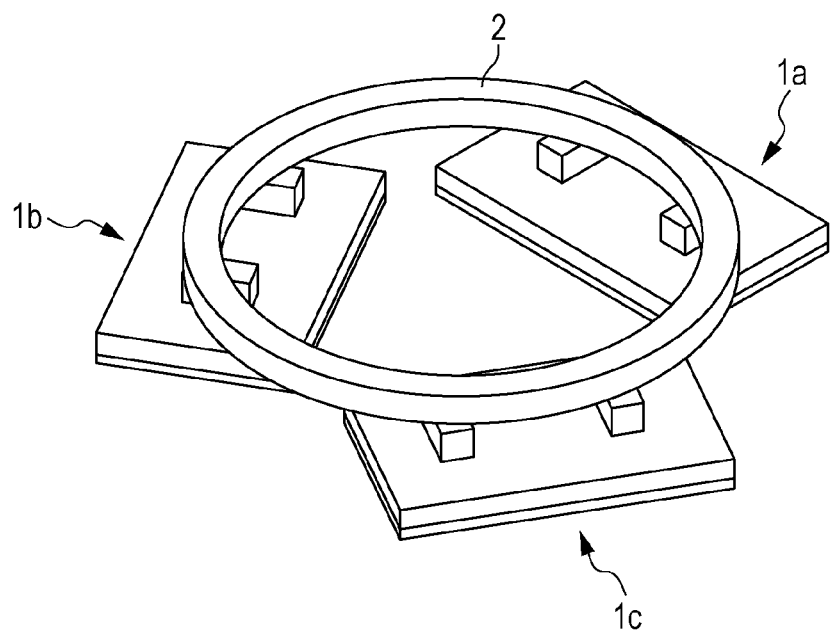
FIG. 1 is a diagram illustrating an example of a structure of a driving apparatus of a vibration-type actuator.

In a first embodiment, a vibration-type actuator includes a plurality of vibrators disposed on a circumference of a circle thereby to drive a ring-shaped driven element to be rotated. An example of a driving apparatus configured to drive such a vibration-type actuator and an example of a method of controlling driving such a vibration-type actuator are described below with reference to figures. In the present embodiment, the driving apparatus of the vibration-type actuator includes a vibration unit including a plurality of vibrators each configured to vibrate in response to applying a voltage to an electromechanical transducer fixed to an elastic element. The driving apparatus also includes a driven element that is pressed against the vibrators of the vibration unit such that the driven element is driven via friction and is moved relatively with respect to the vibration unit. More specifically, as illustrated in FIG. 1, three vibrators 1a, 1b, and 1c are disposed at regular angular intervals of 120°. Although in the present example, it is assumed that the driven element is rotated, the driven element may be fixed and the vibration unit may rotate. There is a guide (not illustrated) that limits the movement of the ring-shaped driven element 2 to the rotation. By driving the one driven element with a force provided as a sum of forces given by the three vibrators, it becomes possible to achieve a thrust three times greater than is provided by a single vibrator.

Figure 2:
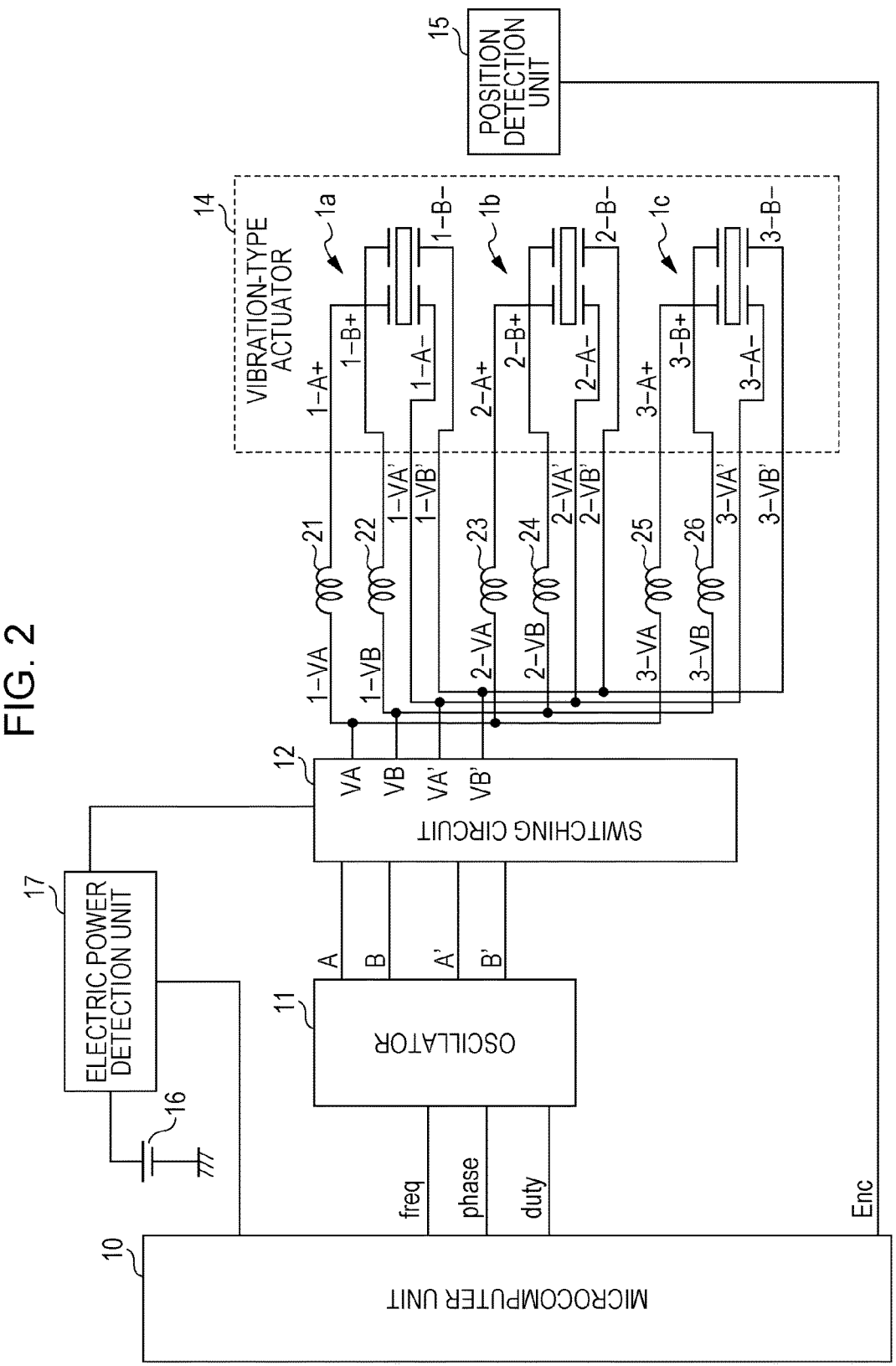
FIG. 2 is a block diagram illustrating an example of a configuration of a driving circuit of a vibration-type actuator.
Figure 12:
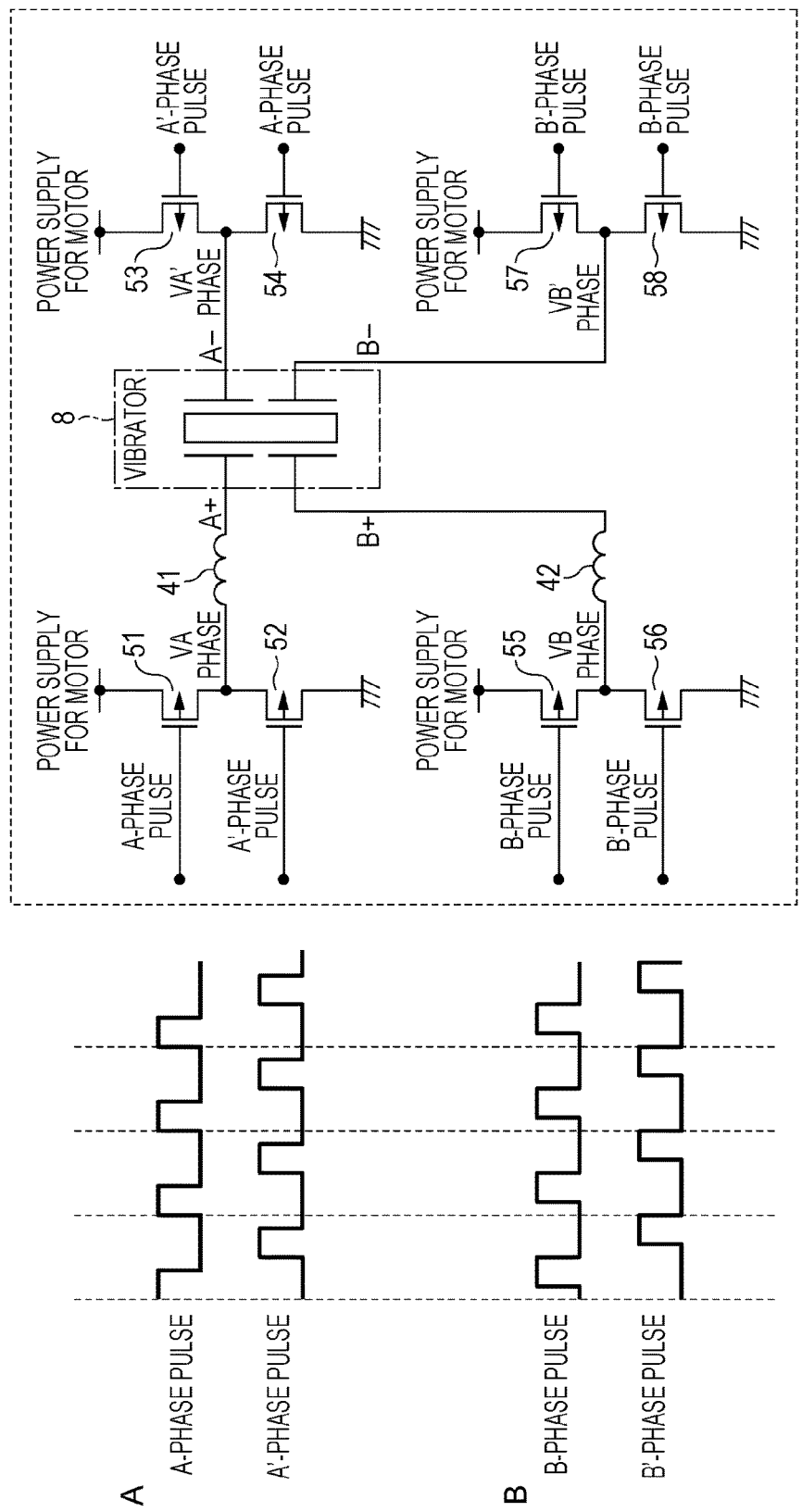
FIG. 12 is a circuit diagram illustrating a switching circuit configured to drive one vibration-type actuator according to a related technique.
Figure 13:
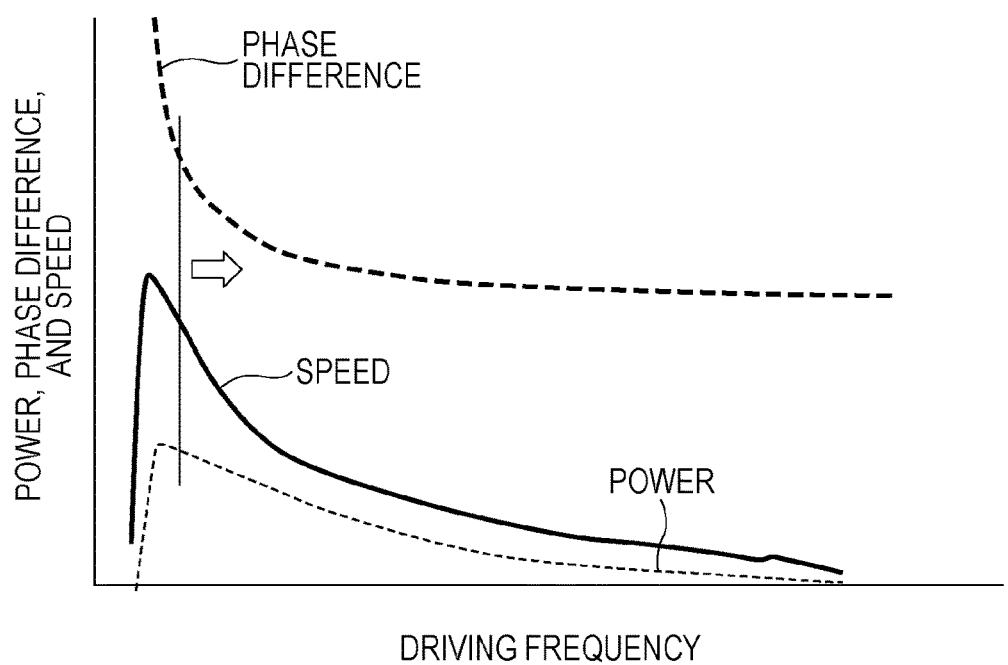
FIG. 13 is a graph for use in illustrating a control circuit according to a related technique and indicating electric power and a motor speed as a function of a driving frequency.
Figure 14:
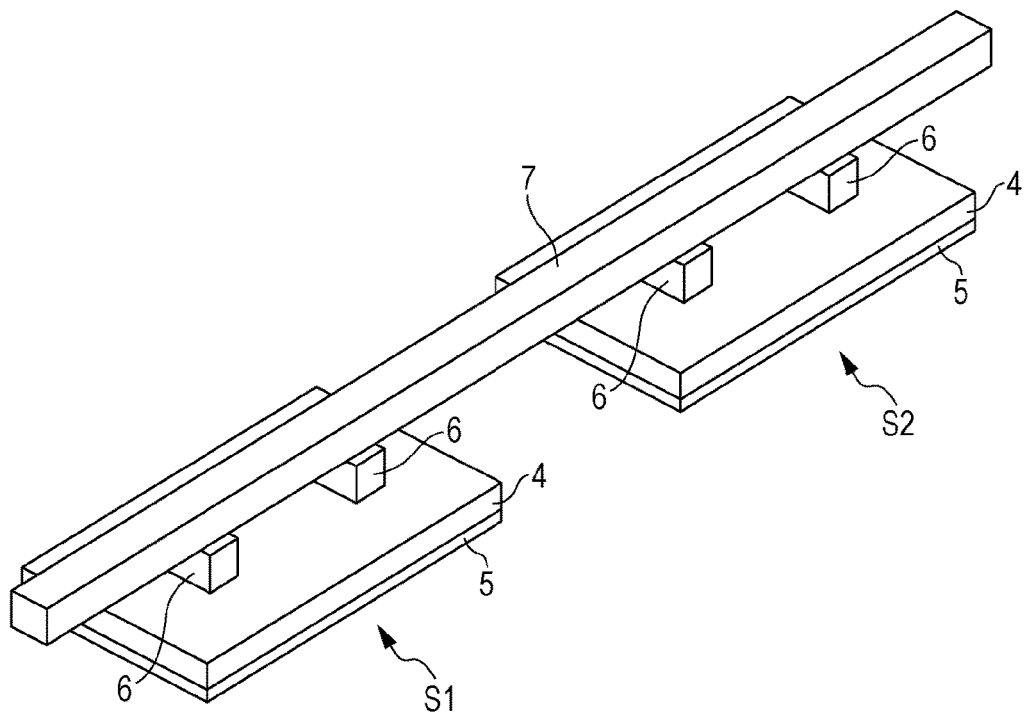
FIG. 14 is a diagram illustrating an example of a structure of a vibration-type actuator according to a related technique in which a plurality of vibrators are disposed in a line.

FIG. 2 is a block diagram illustrating an example of a configuration of a driving circuit of the vibration-type actuator according to the present embodiment. In FIG. 2, reference numeral 14 denotes a vibration-type actuator apparatus including a plurality of vibrators. Unlike vibration-type actuator apparatuses according to the related techniques in which as many switching circuits are provided as there are vibrators, the present vibration-type actuator apparatus includes only one switching circuit that provides electric power to all vibrators via impedance elements. Reference numeral 10 denotes a microcomputer unit including a microcomputer or the like responsible for control. Hereinafter, the total unit 10 including the microcomputer will be referred to simply as the microcomputer unit 10. Reference numeral 11 denotes an oscillator unit configured to generate a first pulse signal A and a second pulse signal B according to a command value issued by the microcomputer unit 10 such that the first pulse signal A has a frequency equal to the resonance frequency of the vibrator, and the second pulse signal B has a frequency equal to that of the first pulse signal A but having a different phase. Note that the pulse width of each pulse and a phase difference between the pulse signal A and the pulse signal B are variable. A' and B' respectively denote pulse signals with phases different by 180° from those of the pulse signal A and the pulse signal B. According to a command issued by the microcomputer unit 10, the driving frequency, the phase difference between A and B, the pulse widths of the respective pulses A and B, and other parameters are determined, and the pulse signals A, B, A', and B' are output. Reference numeral 12 denotes a switching circuit (driving circuit) configured to switch a power supply voltage on and off according to pulse signals A, B, A', and B' illustrated in FIG. 12. More specifically, voltage pulses VA, VB, VA', and VB' are generated according to the pulse signals A, B, A', and B' and applied to the motor. Note that the voltage pulses VA and VB are respectively applied to a terminal A+ and a terminal B+ of the piezoelectric element of the vibrator via impedance elements, while the voltage pulses VA' and VB' are respectively applied directly to a terminal A− and a terminal B− of the piezoelectric element.

The impedance elements are circuit elements adapted to provide proper impedance matching with the piezoelectric elements of the vibrator such that voltages are increased to values that allows more electric power to be supplied to the piezoelectric elements. Reference numeral 16 denotes a DC power supply such as a stabilized power supply, a battery, or the like. To drive a plurality of vibrators, instead of providing as many switching circuits as there are vibrators, the embodiment illustrated in FIG. 1 provides only one switching circuit whose output is split and applied to the respective vibrators. The voltages VA and VB are applied to the vibrators via impedance elements. More specifically, in the present embodiment, there are three vibrators, and the VA signal is split into three signals 1-VA, 2-VA, and 3-VA which are respectively applied to a terminal 1-A+ of a piezoelectric element 1a, a terminal 2-A+ of a piezoelectric element 1b, and a terminal 3-A+ of a piezoelectric element 1c via respective impedance elements 21, 23, and 25. The VA' signal is also split into three signals 1-VA', 2-VA', and 3-VA' which are respectively applied to a terminal 1-A− of the piezoelectric element 1a, a terminal 2-A− of the piezoelectric element 1b, and a terminal 3-A− of the piezoelectric element 1c. Similarly, the VB signal is split into three signals 1-VB, 2-VB, and 3-VB which are respectively applied to a terminal 1-B+ of the piezoelectric element 1a, a terminal 2-B+ of the piezoelectric element 1b, and a terminal 3-B+ of the piezoelectric element 1c via respective impedance elements 22, 24, and 26. The VB' signal is also split into three signals 1-VB', 2-VB', and 3-VB' which are respectively applied to a terminal 1-B− of the piezoelectric element 1a, a terminal 2-B− of the piezoelectric element 1b, and a terminal 3-B− of the piezoelectric element 1c.

Reference numeral 15 denotes a position detection unit (detector) configured to detect a rotational position of a rotation unit including, for example, a photointerupter and a slit plate. The position and speed information of the rotation unit obtained as a result of the detection performed by the position detection unit 15 are transferred to the microcomputer unit 10, and microcomputer unit control the motor according to the position and speed information of the rotation unit. Reference numeral 17 denotes an electric power detection unit serving as a unit to detect the sum of power consumption consumed by the plurality of vibrators and the driving circuit. More specifically, when the vibration-type motor apparatus is driven by the switching circuit 12, the total electric power applied to the three vibrators is detected, and a detected value thereof is sent to the microcomputer unit 10. Note that the detected electric power is given by the product of a voltage and a current, and thus, if the power supply voltage is constant, the value of the electric power may be detected by monitoring only the current value.

In the present example, the single driving circuit is used to drive the plurality of vibrators, and thus the electric power detection unit 17 detects the sum of power consumption consumed by the driving circuit. Note that the electric power detection unit may be configured in other manners as long as the electric power detection unit is capable of detecting the sum of power consumption consumed by the plurality of vibrators. For example, in a case where driving circuits are provided separately for the respective vibrators, the electric power detection unit may be configured to detect the sum of power consumption of these driving circuits.

Figure 3:
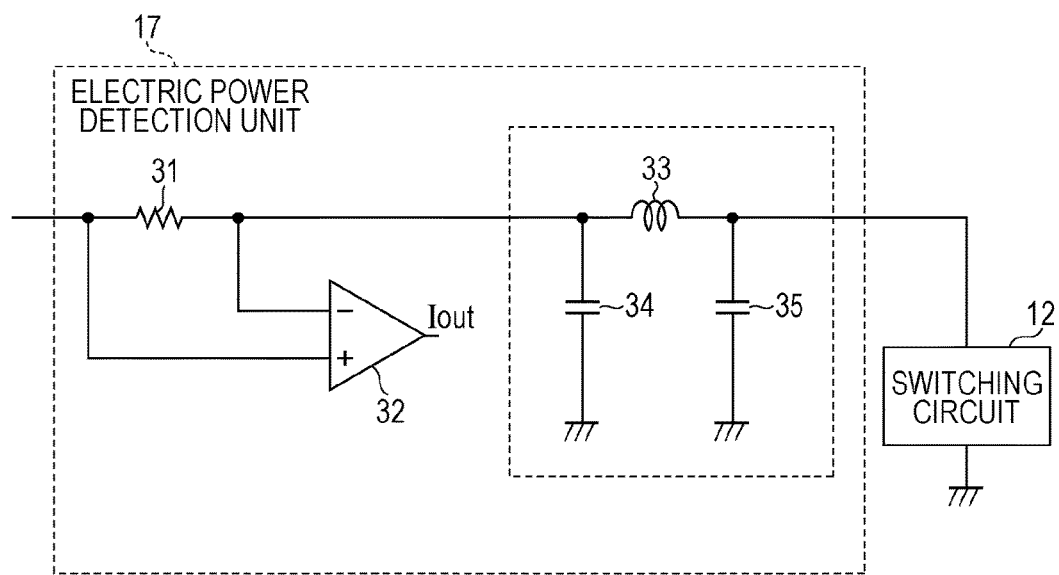
FIG. 3 is a diagram illustrating a current detection unit of a control circuit of a vibration-type actuator.

FIG. 3 is a diagram illustrating details of the current detection circuit serving as the electric power detection unit described above. Reference numeral 31 denotes a shunt resistor for converting a current into a voltage. Reference numeral 32 denotes a differential amplifier that detects the voltage across the shunt resistor. Note that the voltage value is proportional to an output Iout of the differential amplifier 32. The output voltage Iout is input to the microcomputer unit 10 via an analog-to-digital converter or the like. Reference numeral 33 denotes an impedance element, and reference numerals 34 and 35 denote capacitors. These elements 33 to 35 as a whole form a noise removal filter. The provision of the noise removal filter makes it possible to obtain a clean current waveform, which allows the differential amplifier to output a signal with low noise. Note that the noise removal filter may be unnecessary depending on a situation. For example, when the input to the current detection circuit includes low noise, the noise removal filter may be unnecessary. As described above, the three vibrators are driven by the circuit configured in the above-described manner, and the sum of currents flowing through the vibrators is detected by the current detection circuit 17.

Figure 4:
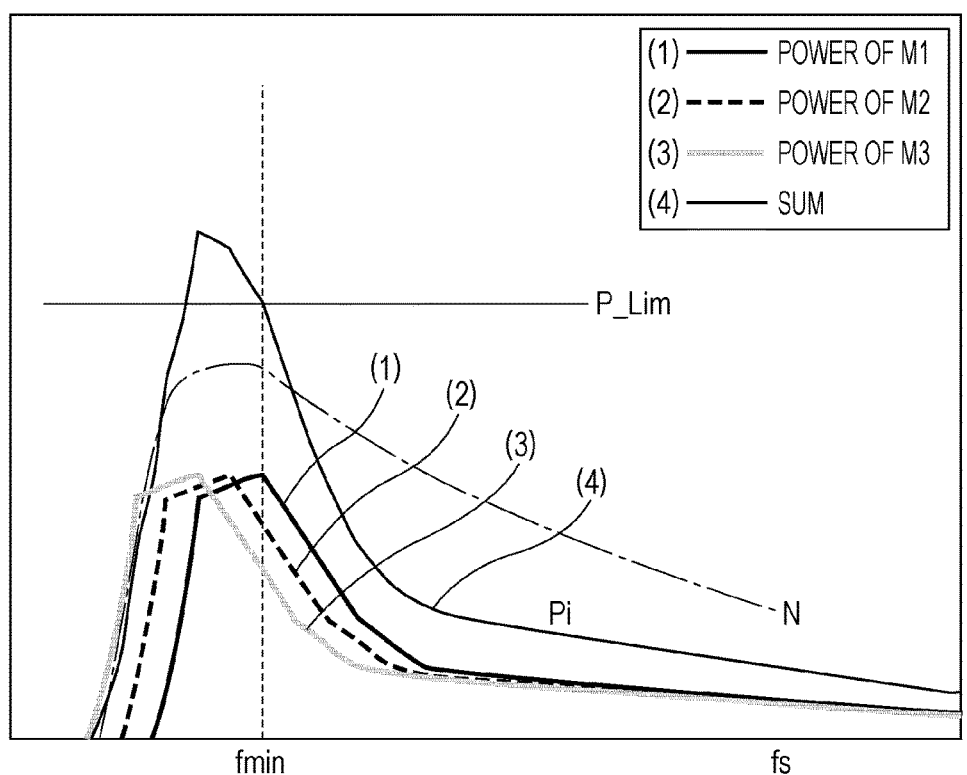
FIG. 4 is a graph for use in illustrating an algorithm and indicating electric power and a motor speed as a function of a driving frequency.
Figure 5:
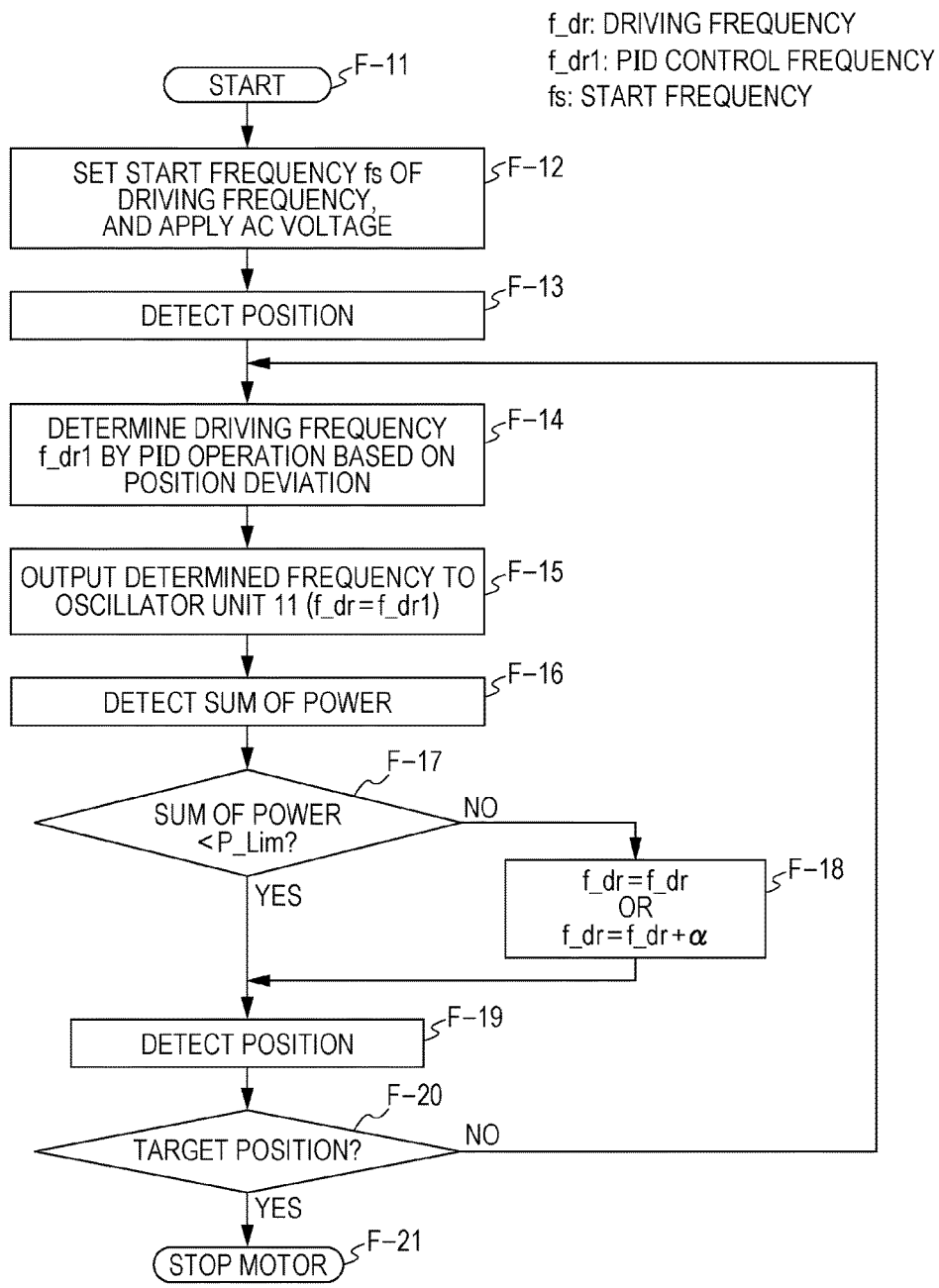
FIG. 5 is a flow chart illustrating an algorithm of a method of controlling driving a vibration-type actuator.

FIG. 4 is a graph for use in illustrating an algorithm and indicating electric power and a motor speed as a function of the driving frequency. FIG. 5 is a flow chart illustrating an algorithm according to the present embodiment. Referring to FIG. 4 and FIG. 5, an operation according to the present embodiment is described below. When the motor is started, the microcomputer unit 10 sets the frequency fs to be low enough, and controls the operation such that an AC voltage is started to be applied to the vibrators (F-11, F-12). Next, the current position is detected using the speed detection unit (F-13). A value obtained as a result of the PID operation based on the position deviation is set as a PID control frequency (f_dr1). (F-14). The PID control frequency is output to the oscillator unit 11 (F-15). Next, the sum of electric power of the three vibrators is detected using the electric power detection circuit 17 (F-16). In FIG. 4, power of M1, power of M2, and power of M3 denote electric power of the three respective vibrators. In this example, as illustrated in FIG. 4, it is assumed that there is a difference in electric power characteristic among the three vibrators due to a change in resonance frequency or the like among the vibrators. Such a difference in frequency characteristic may actually occur due to production errors, pressure errors, positioning errors, and the like. In FIG. 4, a curve (4) illustrates the sum of electric power as a function of frequency. P_Lim indicates a value below that the electric power characteristic of M1, M2, and M3 does not encounter a reduction in electric power characteristic. Note that the electric power of M1, the electric power of M2, and the electric power of M3 are illustrated in FIG. 4 for providing better understanding of the effects of the present embodiment, but what is actually detected is only the sum of electric power. The microcomputer unit 10 determines whether the detected value of the electric power is greater or smaller than the preset value P_Lim (F-17).

In a case where it is determined that detected electric power Pi≥P_Lim, if the frequency of the driving voltage is further reduced from the current value, the result is an increase in electric power. Therefore, the microcomputer unit (driving frequency setting unit) 10 sets the driving frequency to be fixed at the current value or to a higher value (that is, a value equal to the current value plus α) (F-18). In a case where the driving frequency is fixed at a value obtained at a moment when the detected electric power Pi exceeds P_Lim, then there is a possibility that the electric power overshoots, which may cause the detected electric power Pi to be further increased above P_Lim. To handle such a situation, the frequency may be set to be higher by α than the above-described critical frequency so that Pi≥P_Lim does not occur even when an overshoot occurs. Alternatively, the driving frequency setting unit 10 repeatedly sets the driving frequency to be lower than the previously detected driving frequency until the detected electric power Pi becomes equal to P_Lim. By performing the process from F-16 to F-18, it becomes possible to prevent the sum of electric power from exceeding a particular (predetermined) value. Furthermore, because the value of P_Lim is set to be lower than a critical value of electric power corresponding to a frequency below which an abrupt reduction in speed occurs as described above, the process from F-16 to F-18 makes it possible to suppress the abrupt reduction in the driving speed thereby ensuring that the driving is performed within a predetermined range of frequency. On the other hand, in a case where the detected electric power is smaller than P_Lim, the control frequency f_dr1 is set to f_dr, and the driving is performed. The position is then detected, and a determination is performed as to whether a target position has been reached (F-19, F-20). In a case where the target position is not reached, the processing flow returns to F-14 to repeat the controlling of the motor. When the target position is reached, the motor is stopped (F-21).

In the present embodiment, as described above, the sum of electric power of the three vibrators is detected as a function of the frequency, and the frequency is controlled such that the electric power does not exceed the predetermined limit P_Lim thereby preventing the electric power from becoming too large. Furthermore, it becomes possible to control the driving frequency not to go within a frequency range in which an abrupt reduction in speed occurs. The limit of the electric power P_Lim may be set in advance to a value that allows any of the three vibrator not to have too large input electric power taking into account difference in resonance frequency among the three vibrators. Although three vibrators are provided in the present embodiment, the embodiment may be applied to any plural number of vibrators.

Second Embodiment

Figure 6:
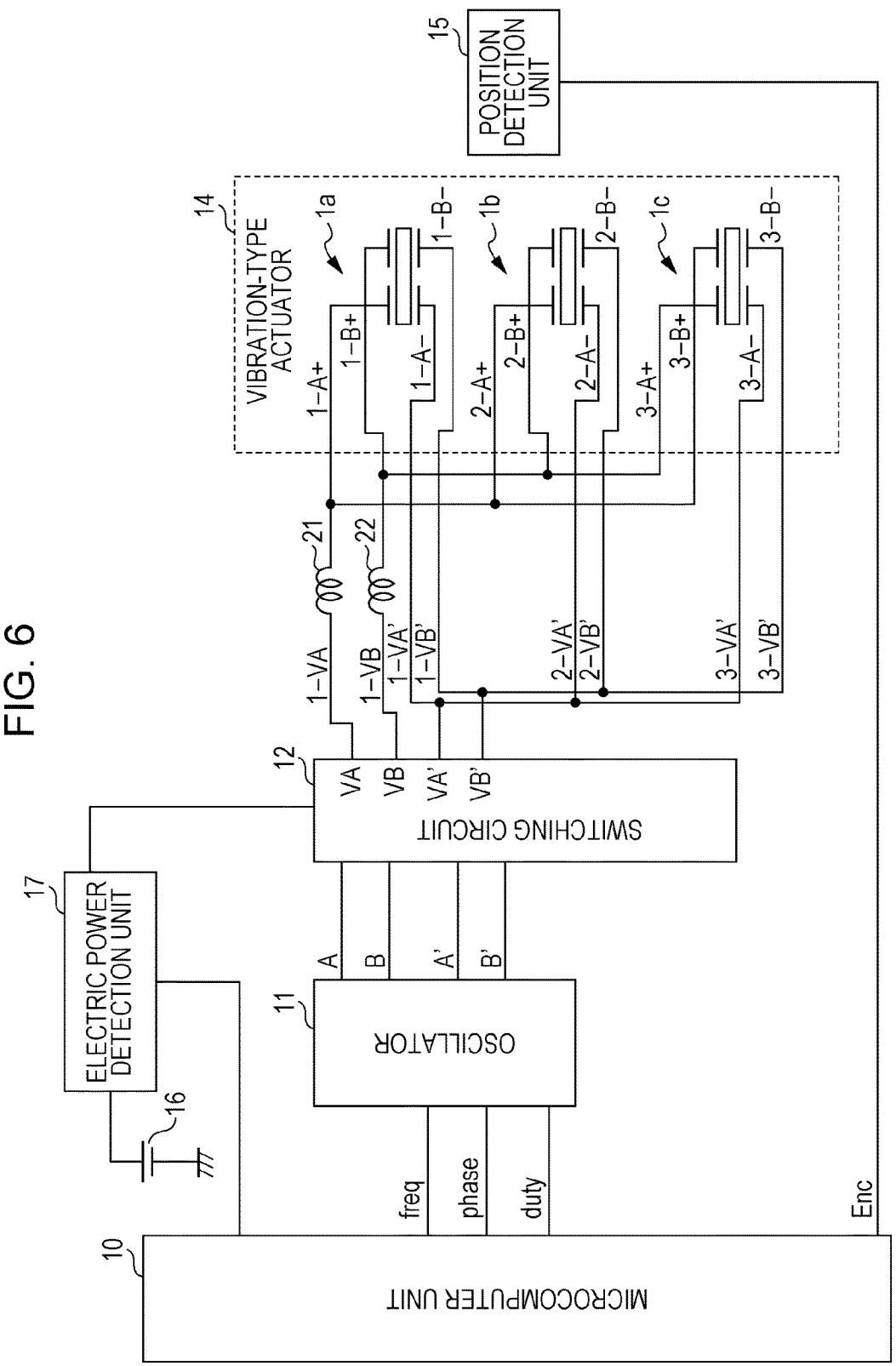
FIG. 6 is a block diagram illustrating an example of a configuration of a driving circuit of a vibration-type actuator.

Next, with reference to FIG. 6, a description is given below as to another example of a driving apparatus of a vibration-type actuator and a method of controlling driving a vibration-type actuator according to a second embodiment. FIG. 6 is a block diagram illustrating an example of a configuration of a driving circuit of a vibration-type actuator according to the second embodiment. In the first embodiment described above, the wiring is split between the switching circuit and the impedance elements before the three vibrators. In contrast, in the second embodiment, the wiring is split between the impedance elements 21 and 22 and the vibrators. In the case where the wiring is split between the switching circuit and the impedance elements as is the case in the first embodiment, even when the resonance frequency is different among the vibrators and when one the vibrators has a reduction in speed, the other vibrators remain in a normal state. In contrast, in the case where the wiring is split between the impedance elements 21 and 22 and the vibrators as is the case in the second embodiment, when the driving frequency of one of the vibrators becomes lower than its resonance frequency, a change may occur in impedance characteristic, which may lead to a change in a voltage applied to the other vibrators. One of method to handle this situation is to provide an impedance element individually to each vibrator (six impedance elements are provided in total). In the second embodiment, to handle this situation, frequencies are controlled so as to suppress a change in electric power characteristic such that vibrators have no reduction in performance even in the configuration there are only two impedance elements which are shared in operation.

Figure 7:
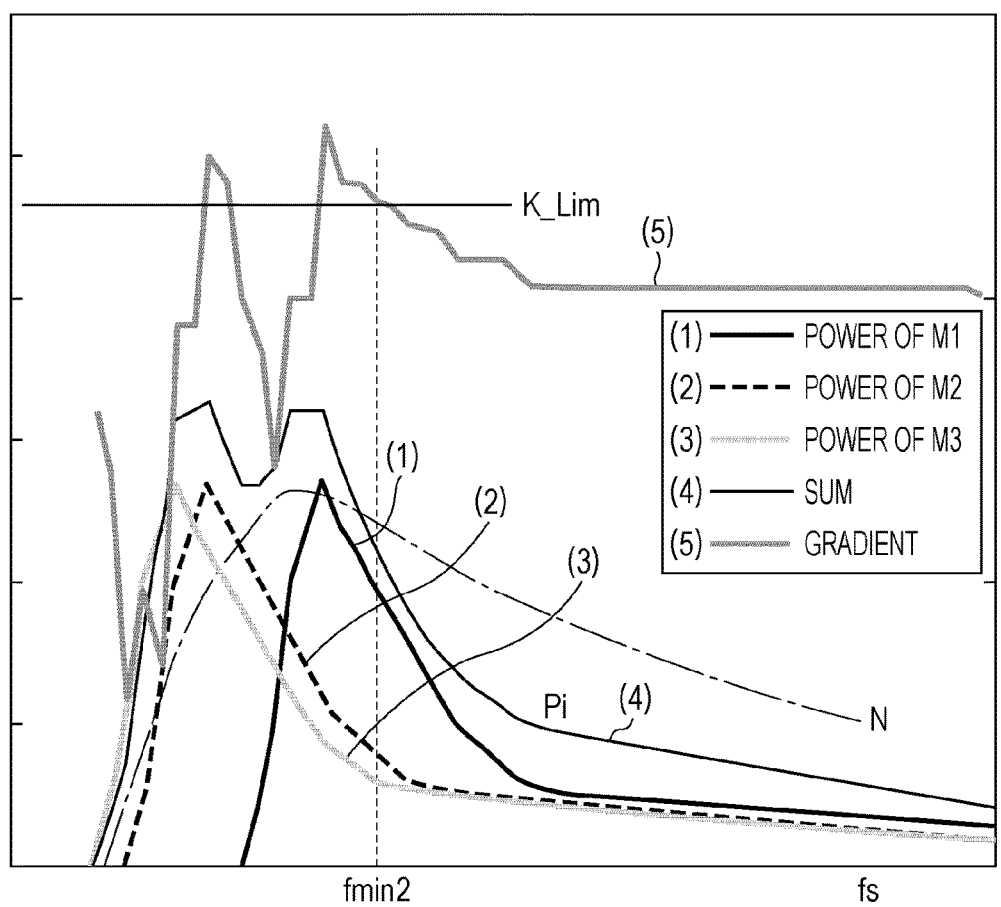
FIG. 7 is a graph for use in illustrating an algorithm and indicating electric power and a motor speed as a function of a driving frequency.
Figure 8:
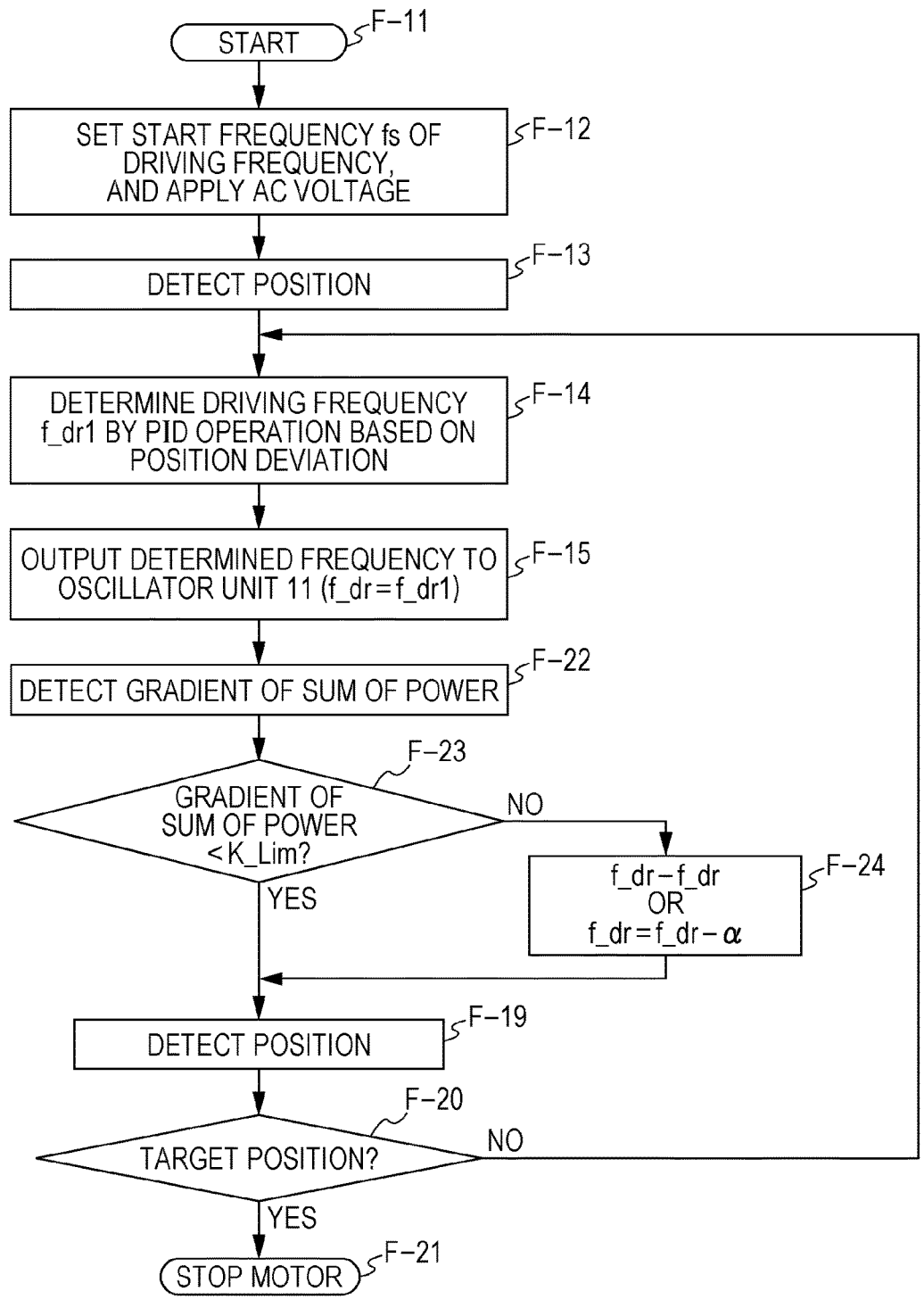
FIG. 8 is a flow chart illustrating an algorithm of a method of controlling driving a vibration-type actuator.

FIG. 7 is a graph indicating a speed and electric power as a function of frequency. Referring to FIG. 7, a control algorithm according to the present embodiment is described below. In the present embodiment, the lower limit of the driving frequency is determined based on the rate of change (gradient) of the sum of electric power with respect to the driving frequency. FIG. 8 is a flow chart illustrating an algorithm according to the present embodiment. Referring to FIG. 7 and FIG. 8, an operation according to the present embodiment is described below. In FIG. 7, as in FIG. 4 according to the first embodiment, electric power is also plotted for individual vibrators although only the total electric power is detected and individual electric power is not detected actually. In the example illustrated in FIG. 7, it is assumed that differences in resonance frequency among the vibrators are greater than those in the first embodiment, and thus there are greater changes in frequencies at which the respective vibrators have their maximum electric power.

In the algorithm illustrated in FIG. 8, operations are similar to those according to the first embodiment except for F-16 to F-18. When the operation is started, the driving frequency is set to a high frequency fs (F-11, F-20). In the present embodiment, as in the first embodiment, the driving frequency setting unit performs an iterative operation in which the control frequency (driving frequency) is decremented via the speed control process until the target speed is reached while monitoring the gradient of the sum of electric power (the rate of change of the sum of the electric power) with respect to the control frequency (F-13 to F-20). In the operation described above, a determination is performed as to whether the gradient of the detected electric power (the rate of change of the detected electric power with respect to the control frequency) is greater or smaller than a predetermined value K_Lim (F-22, F-23). When the rate of change of the detected electric power with respect to the frequency is equal to or greater than K_Lim, if the driving frequency is set to a further lower value, an increase in electric power occurs and the frequency falls within a range in which an abrupt reduction occurs in speed of the vibration motor. To avoid such a situation, the driving frequency is fixed or set to a higher frequency (equal to the current frequency plus α) (F-24). If the driving frequency is set to value at which the rate of change of the detected electric power with respect to the frequency crosses the value of K_Lim, then there is a possibility that an overshoot or the like occurs, which may cause a further increase in the rate of change of the detected electric power with respect to the frequency beyond the value of K_Lim. To avoid such a situation, the frequency may be set to be higher by a than the current value as described above. The shifting value a may be set such that the rate of change of the detected electric power with respect to the frequency does not exceed the value K_Lim even when an overshoot or the like occurs. As long as the driving frequency is maintained in a range in which the rate of change of the detected electric power with respect to the frequency does not exceed the value K_Lim, the driving frequency f_dr is repeatedly controlled to be equal to the control frequency f_dr1 in the speed control loop, and thus the speed control operation is repeatedly performed in the normal mode until a command to stop the motor is issued. When the target position is reached, the motor is stopped (F-21).

Third Embodiment

Figure 9:
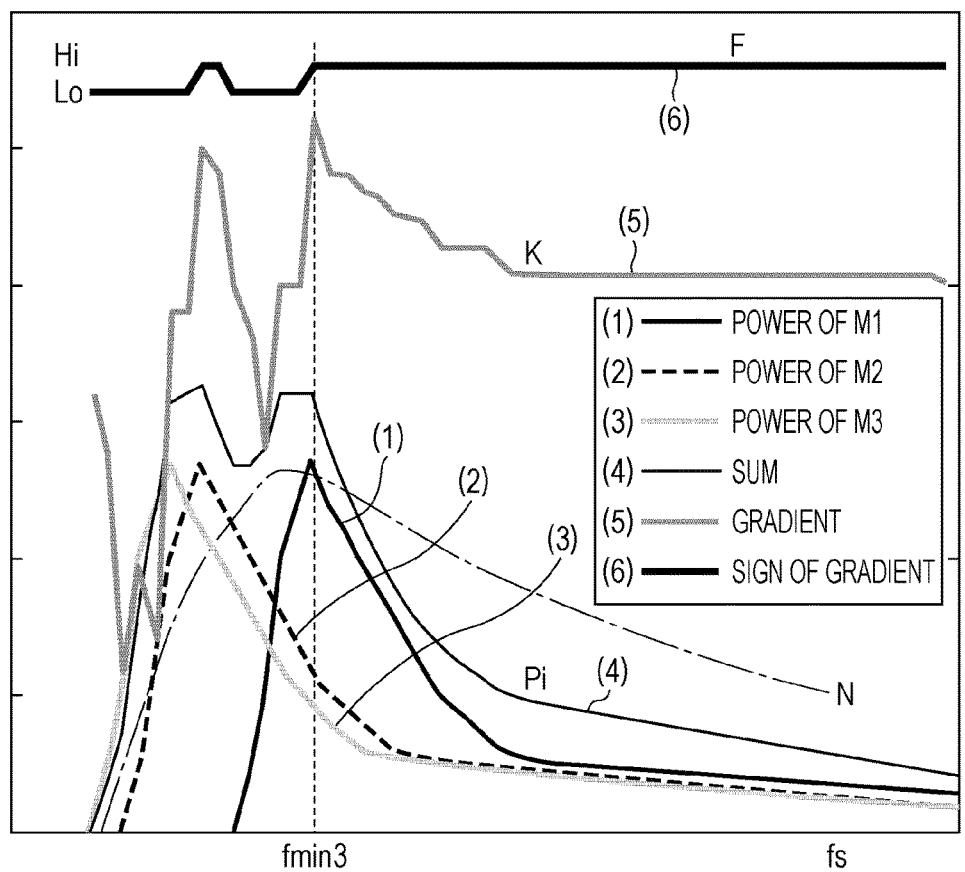
FIG. 9 is a graph for use in illustrating an algorithm and indicating electric power and a motor speed as a function of a driving frequency.

In a third embodiment described below, the sign of the rate of change of the sum of detected power consumption with respect to the frequency is detected, and the driving frequency is controlled such that the driving frequency is not lower than the frequency at which the above-described sign changed from a negative value to a positive value, and at the starting, the frequency is set to a starting value at which the rate of change of the sum of detected power consumption with the respect to the frequency tends to increase, and the frequency is swept to a value at which the driving speed and the power consumption increase. FIG. 9 is a graph indicating a speed, electric power, the sum of electric power, a rate of change of the sum of electric power, a sign of the rate of change as a function of a frequency. Referring to FIG. 9, a control algorithm acceding to the present embodiment is described below. In the present embodiment, the sign of the rate of change of the sum of electric power is calculated, and the lower limit of the driving frequency is determined based on this sign. In the case where the operation frequency s determined based on the value of the rate of change of the sum of electric power as is the case in the second embodiment, it is necessary to determine the limit K_Lim in advance. In contrast, in the present embodiment, the sign of the rate of change of the sum of electric power is detected, and thus it is not necessary to perform the measurement to set the value K_Lim, which allows the algorithm to be simplified. Note that the value of K is the rate of change of the sum of electric power as in the case of the second embodiment, the value of F indicates the sign of the sum of electric power. When the value of F is Hi, the rate of change of the sum of electric power is positive, while when the value of F is Lo, the rate of change of the sum of electric power is negative.

Figure 10:
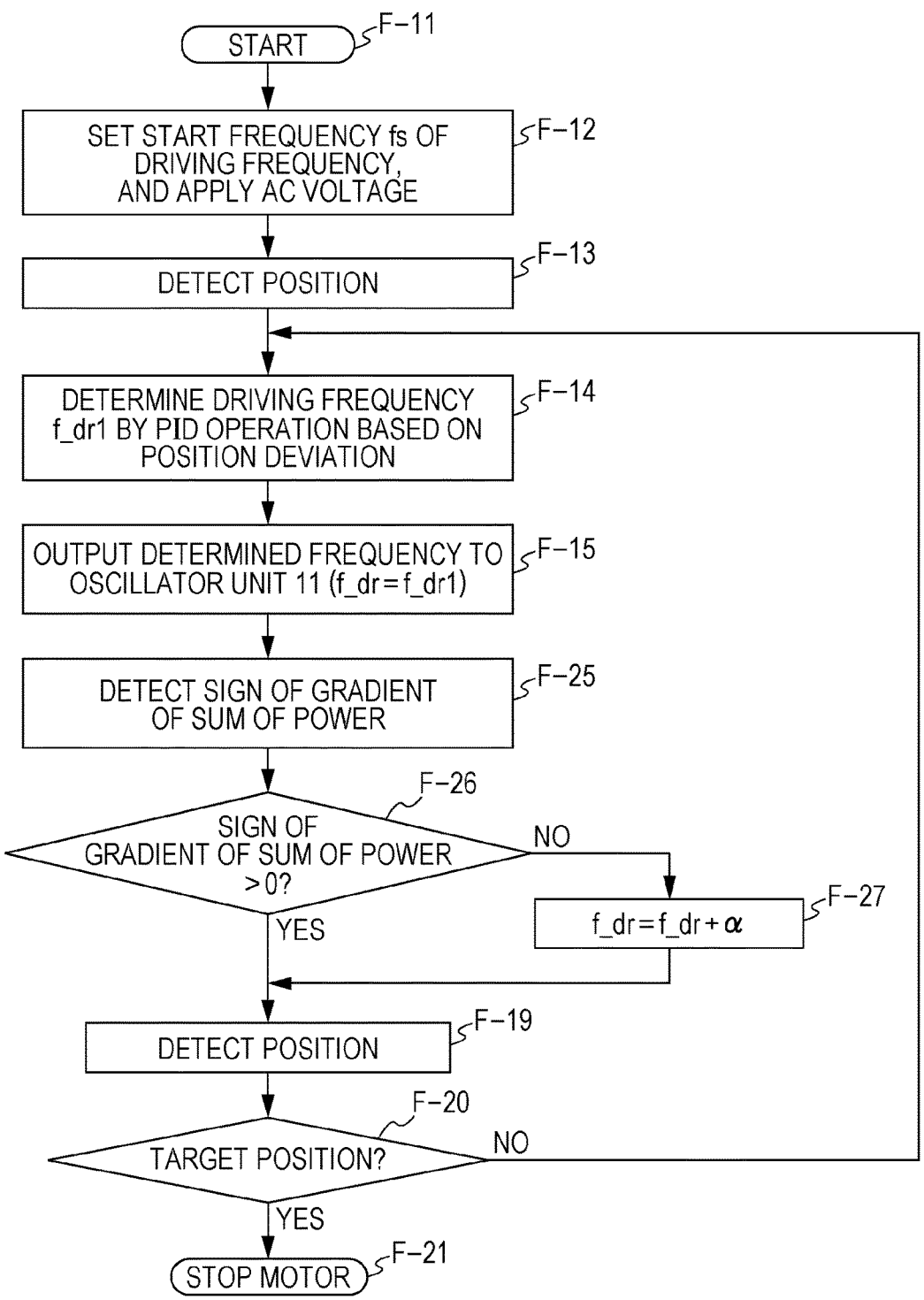
FIG. 10 is a flow chart illustrating an algorithm of a method of controlling driving a vibration-type actuator.
Figure 11:
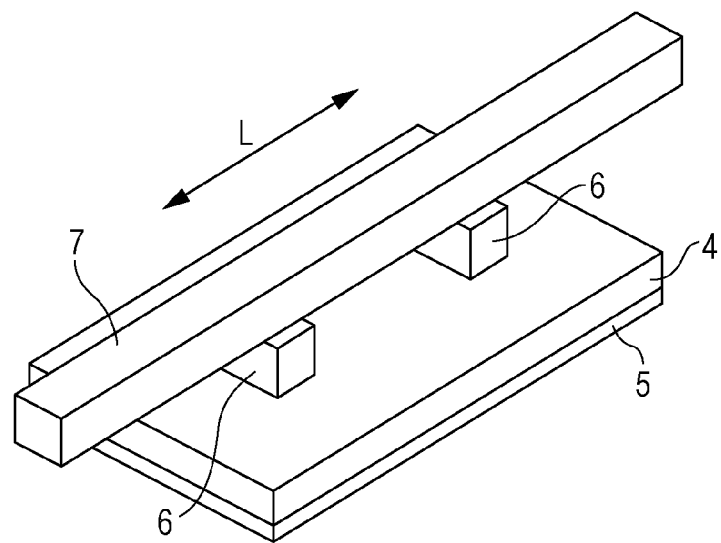
FIG. 11 is a perspective view illustrating an example of a basic structure of a vibration-type actuator according to a related technique.

FIG. 10 is a flow chart illustrating an algorithm according to the present embodiment. Referring to FIG. 9 and FIG. 10, an operation according to the present embodiment is described below. In FIG. 9, as in FIG. 4 according to the first embodiment, electric power is also plotted for individual vibrators although only the sum of electric power is detected and individual electric power is not detected actually. In the algorithm illustrated in FIG. 10, operations are similar to those according to the second embodiment except for F-25 to F-27. When the operation is started, the driving frequency is set to a high frequency fs (F-11, F-12). The sign of the rate of change (gradient) of the sum of electric power with respect to the frequency is monitored while changing the control frequency (driving frequency) in the speed control operation in a similar manner to that of the first embodiment. The driving frequency setting unit repeatedly reduces the frequency as long as the sign is positive. In this operation, the sign of the rate of change (gradient) of the sum of electric power with respect to the frequency (F-25). When the sign of the rate of change (gradient) of the sum of electric power with respect to the frequency becomes negative, it is regarded that the electric power of some vibration motor has started to decrease (the driving frequency has become lower than the resonance frequency), and a further reduction in the driving frequency is stopped or the driving frequency is increased by α (F-27). As may be seen from FIG. 9, in the present embodiment, if the driving frequency is reduced lower than the value at which the sign of the rate of change (gradient) of the sum of electric power with respect to the frequency transits from positive to negative, then there is a possibility that the driving frequency goes into a range in which an abrupt reduction in motor speed, which may cause the vibration motor to stop. In this frequency range, a further reduction in driving frequency does not lead to an increase in the speed of the vibration motor, and thus the speed control loop does not work, that is, it becomes impossible to control the speed. However, when the rate of change of the detected electric power with respect to the frequency is within a range below K_Lim, the speed control loop works well such that the driving frequency f_dr is repeatedly controlled to be equal to the control frequency f_dr1 via the speed control loop, and thus the speed control is performed normally until a command to stop the motor is issued. When the target position is reached, the motor is stopped (F-21).

As described above, the vibration motor including the plurality of vibrator may be driven such that the sum of electric power is detected, and the driving frequency is determined based on the value of electric power, the rate of change, and the sign of the rate of change. This ensures that the vibration motor is driven in a frequency range within which the desired performance is obtained regardless of whether the vibrators have different characteristics. A vibration-type motor including a plurality of vibrators capable of driving a driven element has an advantage that it is small in size and may be easily installed. Because of its advantages, the vibration-type motor is used in a wide variety of apparatuses such as a camera, a video camera, and so on. In such a vibration-type motor, use of the detected sum of electric power in controlling driving of a plurality of vibrators makes it possible to realize a driving circuit having a simple configuration and being capable of stably driving the vibration-type motor.

Fourth Embodiment

Figure 15:
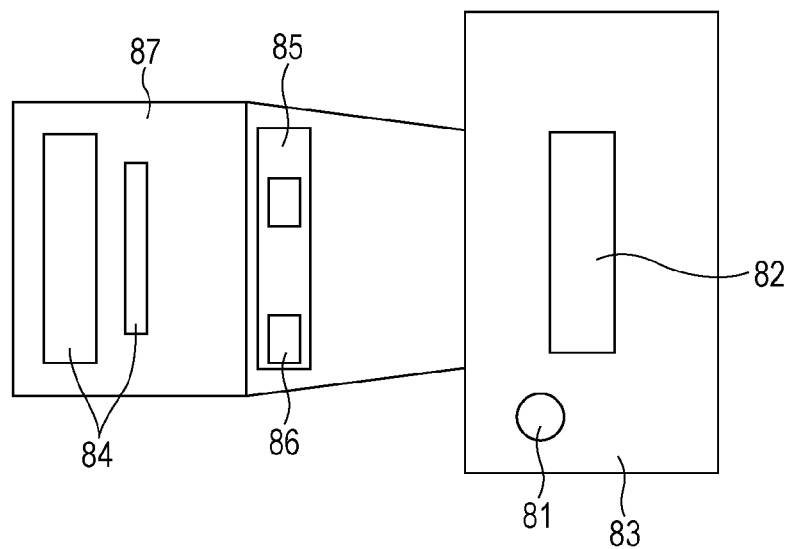
FIG. 15 is a diagram illustrating an example of an application of a vibration-type actuator and a driving circuit thereof.

In a fourth embodiment, as described below with reference to FIG. 15, a vibration-type actuator driven by a driving apparatus according to one of the previous embodiments is applied to an image pickup apparatus such as a camera or the like. FIG. 15 conceptually illustrates a top view of an image pickup apparatus including a driving apparatus and a vibration-type actuator according to the present embodiment. In FIG. 15, an image pickup apparatus 80 includes a main camera body 83 and a lens barrel 87. The main camera body 83 includes a power switch button 81 and an image sensor 82. The lens barrel 87 includes lenses 84, a base 85, and a vibration-type actuator 86. A lens other than the lenses 84 is disposed firmly on the base 85, and this lens is moved by the vibration-type actuator via the base. The lens barrel 87 may be interchangeable such that an optimum interchangeable lens barrel may be attached to main camera body 83 depending on a seen whose image is to be captured. The vibration-type actuator 86 may be driven using a driving apparatus according to one of first to third embodiments described above.

In the example illustrated in FIG. 15, the lenses are moved by the vibration-type actuator. Alternatively, the vibration-type actuator may be disposed in the main camera body such that an image sensor is moved by the vibration-type actuator. Note that the application of the vibration-type actuator driven by the driving apparatus according to one the embodiments is not limited to the example described above, but may be used, for example, to drive a wide variety of stages such as a state of a microscope or the like. The stage may be configured such that it is movable by the vibration-type actuator driven by the driving apparatus according to one of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-257877 filed Nov. 26, 2012, which is hereby incorporated by reference herein in its entirety.

What is claimed is:

1. A driving apparatus of a vibration-type actuator comprising:
   a plurality of vibrators;
   a common contact element;
   a detector configured to detect a sum of power consumption consumed by the plurality of vibrators; and
   a driving frequency setting unit configured to set a driving frequency of the plurality of vibrators in such a manner that a voltage is applied to the plurality of vibrators at a starting frequency higher than any one of resonance frequencies of the plurality of vibrators to generate elliptic motion in the plurality of vibrators and a frequency of the voltage is decreased to a frequency lower than the starting frequency to relatively move the plurality of vibrators and the common contact element by friction so that a relative speed of the plurality of vibrators and the common contact element is increased, that the sum of power consumption does not exceed a predetermined limit, and that the driving frequency becomes higher than any one of the resonance frequencies of the plurality of vibrators.

2. The driving apparatus of the vibration-type actuator according to claim 1, wherein the driving frequency setting unit fixes the driving frequency at a current frequency or sets the driving frequency to a frequency greater than the current frequency based on the sum of power consumption detected by the detector.

3. The driving apparatus of the vibration-type actuator according to claim 1, wherein resonance frequencies of the plurality of vibrators are different from each other.

4. The driving apparatus of the vibration-type actuator according to claim 1, wherein the driving frequency setting unit sets the driving frequency in such a manner that the driving frequency is not lower than a highest resonance frequency among the resonance frequencies of the plurality of vibrators based on the sum of power consumption detected by the detector.

5. The driving apparatus of the vibration-type actuator according to claim 1, further comprising a driving circuit configured to apply a voltage to the plurality of vibrators, wherein the plurality of vibrators comprises a first vibrator and a second vibrator, and wherein the driving circuit is provided common to the first vibrator and the second vibrator.

6. The driving apparatus of the vibration-type actuator according to claim 5, further comprising a first impedance element provided between the first vibrator and the driving circuit and a second impedance element provided between the second vibrator and the driving circuit.

7. The driving apparatus of the vibration-type actuator according to claim 1, further comprising a driving circuit configured to apply a voltage to the plurality of vibrators, wherein the plurality of vibrators comprises a first vibrator and a second vibrator, and wherein the driving circuit comprises a first driving circuit for driving the first vibrator and a second driving circuit for driving the second vibrator.

8. The driving apparatus of the vibration-type actuator according to claim 1, wherein the detector detects a rate of change of the sum of power consumption or a sign of the rate of change of the sum of power consumption.

9. The driving apparatus of the vibration-type actuator according to claim 1, wherein the detector comprises a filter for reducing noises of detected signals.

10. The driving apparatus of the vibration-type actuator according to claim 1, wherein the detector detects a sum of currents to be supplied to the plurality of vibrators as the sum of power consumption.

11. A vibration-type actuator unit, comprising:
a vibration-type actuator comprising a plurality of vibrators and causing a relative movement between the plurality of vibrators and a common contact element; and
the driving apparatus of the vibration-type actuator according to claim 1.

12. A lens barrel, comprising:
a lens; and
the vibration-type actuator unit according to claim 11 configured to move the lens.

13. An image pick-up apparatus, comprising:
a lens;
an image sensor; and
the vibration-type actuator unit according to claim 11 configured to move the lens or the image sensor.

14. The driving apparatus of the vibration-type actuator according to claim 1, wherein the common contact element is shaped like a circular ring, and the plurality of vibrators is disposed on the circular ring at intervals.

15. The driving apparatus of the vibration-type actuator according to claim 1, wherein the common contact element is shaped like a straight line, and the plurality of vibrators is disposed on the straight line at intervals.

16. A driving apparatus of a vibration-type actuator comprising:
a plurality of vibrators;
a common contact element;
a detector configured to detect a sum of currents to be supplied to the plurality of vibrators; and
a driving frequency setting unit configured to set a driving frequency of the plurality of vibrators in such a manner that a voltage is applied to the plurality of vibrators at a starting frequency higher than any one of resonance frequencies of the plurality of vibrators to generate elliptic motion in the plurality of vibrators and a frequency of the voltage is decreased to a frequency lower than the starting frequency to relatively move the plurality of vibrators and the common contact element by friction so that a relative speed of the plurality of vibrators and the common contact element is increased, that the sum of currents does not exceed a predetermined limit, and that the driving frequency becomes higher than any one of the resonance frequencies of the plurality of vibrators.

17. The driving apparatus of the vibration-type actuator according to claim 11, wherein the detector detects a rate of change of the sum of currents or a sign of the rate of change of the sum of currents.

18. A vibration-type actuator unit, comprising:
a vibration-type actuator comprising a plurality of vibrators and causing a relative movement between the plurality of vibrators and a common contact element; and
the driving apparatus of the vibration-type actuator according to claim 16.

19. A lens barrel, comprising:
a lens; and
the vibration-type actuator unit according to claim 18 configured to move the lens.

20. An image pick-up apparatus, comprising:
a lens;
an image sensor; and
the vibration-type actuator unit according to claim 18 configured to move the lens or the image sensor.

21. The driving apparatus of the vibration-type actuator according to claim 16, wherein the common contact element is shaped like a circular ring, and the plurality of vibrators is disposed on the circular ring at intervals.

22. The driving apparatus of the vibration-type actuator according to claim 16, wherein the common contact element is shaped like a straight line, and the plurality of vibrators is disposed on the straight line at intervals.

23. A method of controlling a vibration-type actuator comprising a plurality of vibrators and a common contact element, the method comprising:
detecting a sum of power consumption consumed by the plurality of vibrators; and
setting a driving frequency of the plurality of vibrators in such a manner that a voltage is applied to the plurality of vibrators at a starting frequency higher than any one of resonance frequencies of the plurality of vibrators to generate elliptic motion in the plurality of vibrators and a frequency of the voltage is decreased to a frequency lower than the starting frequency to relatively move the plurality of vibrators and the common contact element by friction so that a relative speed of the plurality of vibrators and the common contact element is increased, that the sum of power consumption does not exceed a predetermined limit, and that the driving frequency becomes higher than any one of the resonance frequencies of the plurality of vibrators.

24. The method of controlling a vibration-type actuator according to claim 23, wherein the common contact element is shaped like a circular ring, and the plurality of vibrators is disposed on the circular ring at intervals.

25. The method of controlling a vibration-type actuator according to claim 23, wherein the common contact element is shaped like a straight line, and the plurality of vibrators is disposed on the straight line at intervals.

26. A method of controlling a vibration-type actuator comprising a plurality of vibrators and a common contact element, the method comprising:
detecting a sum of currents to be supplied to the plurality of vibrators; and
setting a driving frequency of the plurality of vibrators in such a manner that a voltage is applied to the plurality of vibrators at a starting frequency higher than any one of resonance frequencies of the plurality of vibrators to generate elliptic motion in the plurality of vibrators and a frequency of the voltage is decreased to a frequency lower than the starting frequency to relatively move the plurality of vibrators and the common contact element by friction so that a relative speed of the plurality of vibrators and the common contact element is increased, that the sum of currents does not exceed a predetermined limit, and that the driving frequency becomes higher than any one of the resonance frequencies of the plurality of vibrators.

27. The method of controlling a vibration-type actuator according to claim 26, wherein the common contact element is shaped like a circular ring, and the plurality of vibrators is disposed on the circular ring at intervals.

28. The method of controlling a vibration-type actuator according to claim 26, wherein the common contact element is shaped like a straight line, and the plurality of vibrators is disposed on the straight line at intervals.

29. A vibration-type actuator comprising:
   a plurality of vibrators;
   a common contact element;
   a detector configured to detect a sum of power consumption consumed by the plurality of vibrators; and
   a driving frequency setting unit configured to set a driving frequency of the plurality of vibrators in such a manner that a voltage is applied to the plurality of vibrators at a starting frequency higher than any one of resonance frequencies of the plurality of vibrators and a frequency of the voltage is decreased to a frequency lower than the starting frequency to relatively move the plurality of vibrators and the common contact element by friction, and that the sum of power consumption does not exceed a predetermined limit.

30. The vibration-type actuator according to claim 29, wherein the voltage is applied to the plurality of vibrators to generate elliptic motion in the plurality of vibrators.

31. The vibration-type actuator according to claim 29, wherein the frequency of the voltage is higher than any one of the resonance frequencies of the plurality of vibrators.

32. An apparatus comprising:
   a member; and
   the vibration-type actuator according to claim 29,
   wherein the vibration-type actuator is configured to move the member.

33. The apparatus according to claim 32, wherein the member is a lens and/or an image sensor.

34. A vibration-type actuator comprising:
   a plurality of vibrators;
   a common contact element;
   a detector configured to detect a sum of currents to be supplied to the plurality of vibrators; and
   a driving frequency setting unit configured to set a driving frequency of the plurality of vibrators in such a manner that a voltage is applied to the plurality of vibrators at a starting frequency higher than any one of resonance frequencies of the plurality of vibrators and a frequency of the voltage is decreased to a frequency lower than the starting frequency to relatively move the plurality of vibrators and the common contact element by friction, and that the sum of currents does not exceed a predetermined limit.

35. The vibration-type actuator according to claim 34, wherein the voltage is applied to the plurality of vibrators to generate elliptic motion in the plurality of vibrators.

36. The vibration-type actuator according to claim 34, wherein the frequency of the voltage is higher than any one of the resonance frequencies of the plurality of vibrators.

37. An apparatus comprising:
   a member; and
   the vibration-type actuator according to claim 34,
   wherein the vibration-type actuator is configured to move the member.

38. The apparatus according to claim 37, wherein the member is a lens and/or an image sensor.

* * * * *